United States Patent [19] [11] 3,770,284
Galloway [45] Nov. 6, 1973

[54] SHAFT AND LINE SEALS

[75] Inventor: Peter Galloway, Whitley Bay, England

[73] Assignee: George Angus & Company Limited, Newcastle, England

[22] Filed: Sept. 9, 1968

[21] Appl. No.: 758,348

[52] U.S. Cl. .................. 277/92, 277/231, 277/235
[51] Int. Cl. ................... F16j 15/38, B65d 53/00
[58] Field of Search .................... 277/92, 231, 235; 305/11

[56] References Cited
UNITED STATES PATENTS

| 2,373,443 | 4/1945 | Armington | 277/92 |
| 3,244,457 | 4/1966 | Ross | 277/92 |
| 3,390,923 | 7/1968 | Reinsma | 305/11 |
| 3,447,810 | 6/1969 | Porter | 277/92 |

FOREIGN PATENTS OR APPLICATIONS

| 361,172 | 5/1962 | Switzerland | 277/92 |

Primary Examiner—Paul E. Maslousky
Attorney—Larson, Taylor & Hinds

[57] ABSTRACT

A shaft seal, of the face seal type, consists of a ring of microcellular polyurethane of which one end forms a holding portion, to fit on a shaft, and the other end provides a sealing face, of relatively small area, to be held against a sealed surface by the resilience of the ring itself, thus avoiding the need for a loading spring.

1 Claim, 4 Drawing Figures

SHAFT AND LINE SEALS

This invention relates to shaft and like seals of the kind, known as face seals, which each consist of a sealing ring, to surround a shaft or like part, with an end face which bears resiliently against a radial surface of another part, such as a housing, bearing or shaft collar, to allow relative rotation but prevent escape of fluid between the parts.

Many existing face seals are of relatively complicated construction, comprising a sealing ring carried by a bellows or similar member and having a spring to load the sealing ring axially against a sealed surface in use.

The object of the present invention is to provide a face seal of very simple construction, utilising the resilient properties of a suitable elastomeric material so as to obviate the need for a loading spring.

According to the invention, a face seal consists of a ring of resiliently deformable microcellular polyurethane material of which one end forms a holding portion, by which the ring can be mounted fast on one of two relatively rotatable members to be sealed, and the other end is a face sealing end, being formed as or carrying a sealing surface member with a transversely radial sealing face to seal against an opposed sealed surface of the other of the two relatively rotatable members, the ring having an axial cross-sectional shape such that its transversely radial cross-sectional area is smaller at the face sealing end than at the holding portion. Preferably the axial cross-sectional shape of the ring is substantially tapered, but could be stepped, from the face sealing end towards the holding portion.

When the ring is mounted between the two relatively rotatable members so that the ring is under axial compression against the sealed surface, the ring will maintain its sealing surface member against the sealed surface by virtue of its own resilience and with an axial sealing pressure proportional to its axial compression. The need for a loading spring is thus avoided.

A suitable microcellular polyurethane material for the face seal ring is a polyester-based material having an apparent density, i.e. including the volume of the cells, of 0.3 to 0.7 grammes per cubic centimetre (g/cc).

The sealing surface member may be an end surface of the sealing ring itself. Alternatively, the sealing surface member may be a ring of solid polyurethane material, also based on polyester, having a density of 1.0 to 1.5 g/cc.

A suitable Shore hardness for the polyurethane material, measured on a solid sample, is 80°–95°A.

By suitably tapered cross-sectional shaping, the resilience or spring rate of the ring can be designed to give an increase in rate with increase in axial compression of the ring to suit a required sealing pressure within the capacity of the ring.

A preferred cross-sectional shape is based on a trapezoid having a shorter side, of two opposite parallel sides, formed by the face sealing end of the ring and a longer side, or base, at the other end of the ring which forms the holding portion. Preferably also the cross-section of the ring is asymmetrical so that the sealing face is offset towards the outer periphery to obtain as large a sealing area as possible for a given outer diameter of the ring and a given radial dimension of the sealing surface.

The sealing ring may be mounted, by its base or holding portion, directly on one of two members to be sealed but preferably the base of the ring has a surrounding flanged metal or plastics casing ring to serve as a mounting ring.

Two examples of face seals in accordance with the invention are illustrated on the accompanying drawing, in which.

Each of the seals illustrated consists of a moulded ring 1 of microcellular polyurethane material held by its base, as a holding portion 1$^a$, in a metal or plastics casing ring 2 which is substantially of L-section with an inturned outer peripheral axial flange 2$^a$ and a radial flange 2$^b$.

Figure 1:
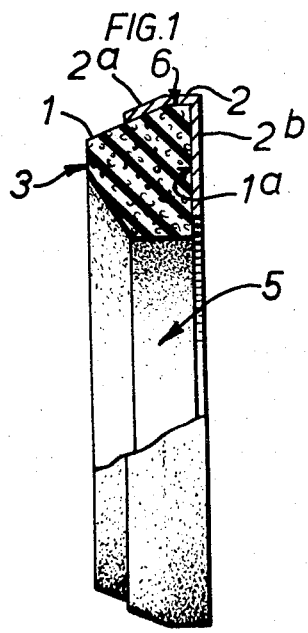
FIG. 1 is a side elevation, partly in axial section, of one face seal.
Figure 2:
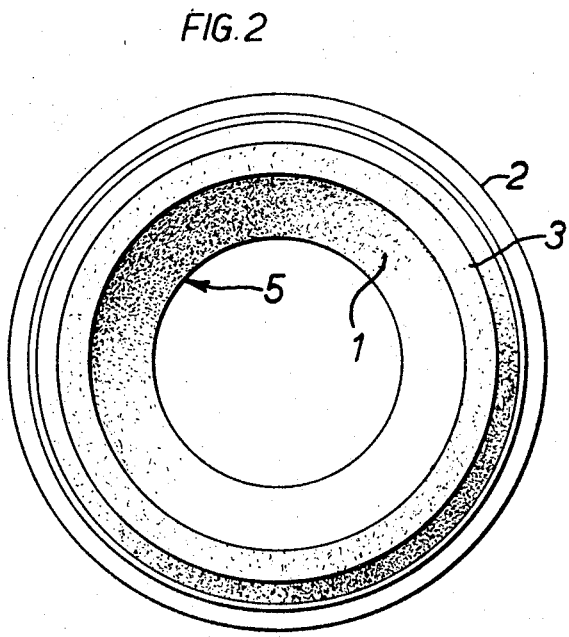
FIG. 2 is an end elevation showing the face of the seal of FIG. 1.

The seal of FIGS. 1 and 2 has a face sealing surface member formed by an end surface 3 of the ring 1 itself.

Figure 3:
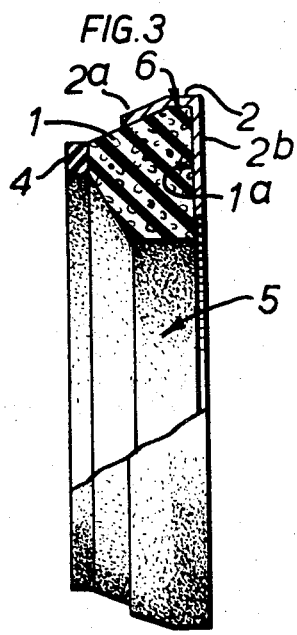
FIG. 3 is a side elevation, corresponding to FIG. 1, of another form of face seal.
Figure 4:
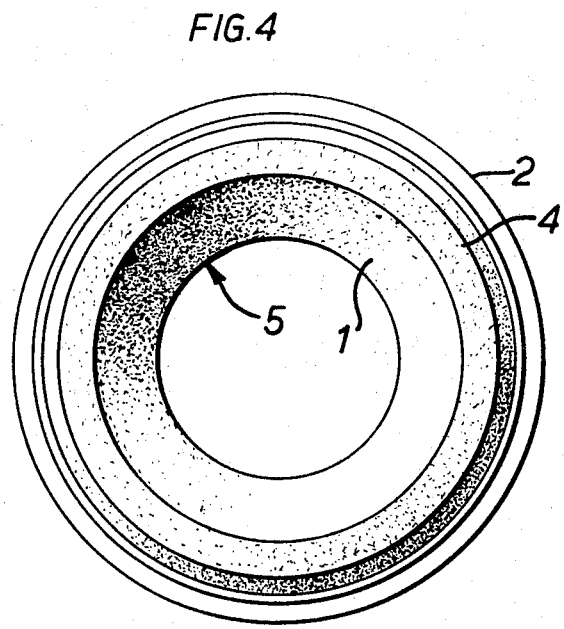
FIG. 4 is an end elevation, corresponding to FIG. 2, of the seal of FIG. 3.

The seal of FIGS. 3 and 4 has a face sealing surface member provided by a ring 4, of solid polyurethane material, adhesively secured or bonded to the front end surface of the ring 1.

It will be seen that the ring 1, in both seals, is basically of trapezoid cross-sectional shape with one narrow end face offset towards the outer periphery of the ring, to form the sealing surface 3 or support the ring 4, and the opposite parallel end face forming the base of the holding portion 1$^a$.

Although the ring 1 has been described as basically of trapezoid cross-sectional shape, having opposite parallel end faces and being of increasing cross-sectional area from the face sealing end to the base, the cross-sectional shape of the ring 1 is not a quadrilateral but is in fact an irregular hexagon. The hexagonal shape is produced by inner and outer cylindrical surfaces 5 and 6. The outer cylindrical surface 6 conforms to the shape of the cylindrical part of the casing ring flange 2$^a$ whilst the inner cylindrical surface 5, which is will be noted is of smaller diameter than the inner diameter of the radial flange 2$^b$ of the casing ring 2, forms a cylindrical sealing surface for resilient sealing contact with a shaft or like part on which the seal is mounted. The cylindrical surface 5 can therefore form, around a shaft, a radial seal the tightness of which is ensured by the resilient character of the ring 1.

In use, the seal is mounted on one relatively rotatable part to be sealed and is held firmly in place, for example being an interference fit in a housing or held axially by a collar or clip on a shaft, so that it is pre-loaded axially against a transversely radial surface of another part to be sealed. The degree of pre-loading is selected according to the resilient characteristics of the ring 1 so as to ensure maintenance of a seal, by the surface 3 or the ring 4, against the surface to be sealed.

The face seals of the present invention are particularly suitable under highly abrasive conditions such as are encountered by the seals of track rollers of vehicle caterpillar tracks.

Polyurethane materials can be made of suitable toughness and abrasion resistance and the microcellular material of the sealing rings can be impregnated, if required, with grease or other lubricant which opposes penetration of water, or other fluid, and can also lubricate the sealed surface, which need not be finely machined in the case of a seal as shown by FIGS. 1 and 2.

For example, the seal material may be impregnated with molybdenum disulphide/silicone oil filler.

The sealing surface 3 may have a thickened moulding skin, which can be produced by suitable processing in manufacture, or a facing could be applied by spraying or dip-coating.

What is claimed is:

1. A face seal comprising a sealing ring of resiliently compressible microcellular polyurethane having one end portion constituting a holding portion, for mounting fast on one of two relatively rotatable members to be sealed, and the other end portion of said sealing ring constituting a face-sealing end, comprising a transversely radial sealing face to seal against the other of said two members, said sealing ring having an axial cross-sectional shape which is an irregular hexagon, so that said face-sealing end is tapered and offset towards the outer periphery of said sealing ring and said holding portion has sides provided by cylindrical surfaces at the inner and outer peripheries respectively of said sealing ring, and a casing ring which is substantially of L-section comprising a radial flange of which the inner diameter is larger than the outer diameter of said holding portion and an outer peripheral axial flange surrounding the outer cylindrical surface of said holding portion and part of the taper of said face-sealing end.

* * * * *